Patented Feb. 20, 1940

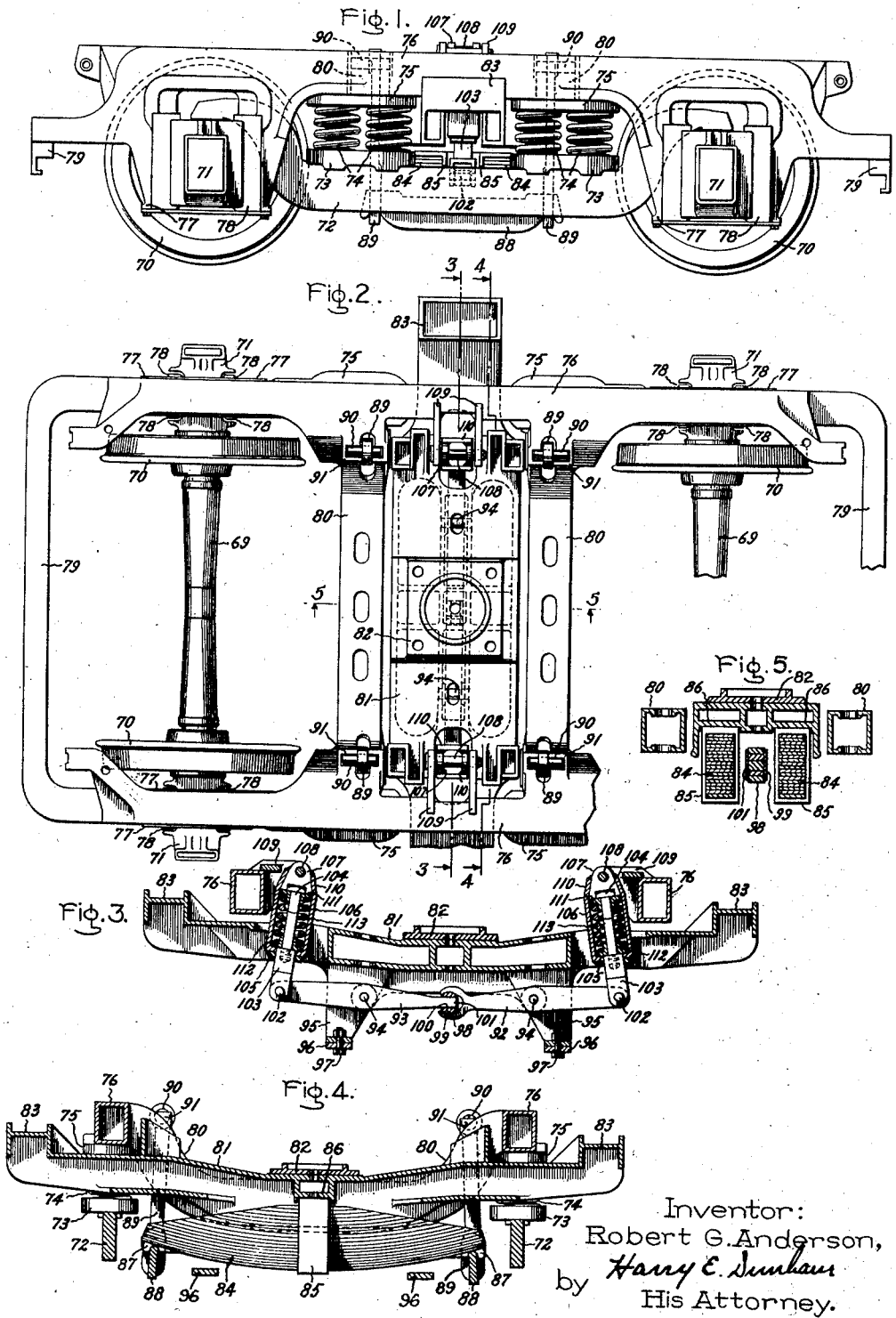

2,190,763

UNITED STATES PATENT OFFICE 2,190,763

RAILWAY TRUCK

Robert G. Anderson, Erie, Pa., assignor to General Electric Company, a corporation of New York Original application December 15, 1937, Serial No. 179,907. Divided and this application August 28, 1939, Serial No. 292,310

6 Claims. (Cl. 105—190)

My invention relates to trucks for railway vehicles.

An object of my invention is to provide an improved railway truck providing a flexible resilient support for the balanced vertical loads and providing a resilient mechanism for equalizing the load transversely of the sides of the truck for restraining transverse tilting thereof.

Further objects and advantages of my invention will become apparent and my invention will be better understood from the following description referring to the accompanying drawing, and the features of novelty which characterize my invention will be pointed out with particularity in the claims annexed to and forming part of this specification. This application is a division of my copending application Serial No. 179,907, filed December 15, 1937, and assigned to the same assignee as this application.

In the drawing, Fig. 1 is a side elevational view of a truck embodying my invention; Fig. 2 is a fragmentary plan view of the truck illustrated in Fig. 1; Fig. 3 is a sectional view taken along line 3—3 of the truck shown in Fig. 2; Fig. 4 is a sectional view taken along line 4—4 of the truck shown in Fig. 2; and Fig. 5 is a sectional view taken along line 5—5 of Fig. 2.

Referring to the drawing, in Figs. 1 and 2 I have shown a truck for a railway vehicle having a pair of axles 69 supported by wheels 70 and arranged to support longitudinally extending equalizers 72 on journal boxes 71 mounted on each end of the axles. The equalizers 72 are provided with spring seats 73 on which a plurality of coil springs 74 is mounted and is arranged to support resiliently the vertical load of the truck frame. The upper ends of these coil springs 74 engage spring seats 75 secured to the under side of side frames 76 of the truck frame, and these side frames 76 are provided with pedestal jaws 77 and pedestal shoes 78, which slidably engage the sides of the journal boxes 71. The truck frame is provided with end frames 79 arranged to rigidly secure together the ends of the truck side frames 76 at each end of the truck, and a pair of transoms 80 is arranged in longitudinally spaced-apart relation adjacent the central portion of the truck and extends between and joins the side frames 76 of the truck. A swing bolster 81 having a center bearing plate 82 and side bearings 83 extending beyond the side frames 76 is arranged intermediate the inner sides of the transoms 80. The swing bolster 81 is transversely movable and is supported on the transoms 80 by a pair of transversely extending semi-elliptic leaf springs 84 arranged on each side of the bolster 81 and provided with spring straps 85 engaging bearings 86 formed on the under side of the bolster 81 adjacent the longitudinal center thereof, as shown in Figs. 4 and 5. The ends 87 of the semi-elliptic springs 84 are supported on the truck frame by longitudinally extending equalizer bars 88, which are mounted at each end thereof in slots formed in the lower ends of upwardly extending supporting links 89. These swing or supporting links 89 are pivotally supported at the upper ends thereof by pivot pins 90 pivotally mounted in bearings 91 formed on the transoms 80 adjacent the side frames 76. In this manner, only the balanced vertical forces acting upon the swing bolster 81 are transmitted to the truck frame through the pivotally mounted resilient semi-elliptic springs 84, as only the forces acting on the central portion of the swing bolster 81 are transmitted through the bearing 86 and the spring 84 to the truck frame. This permits the use of a more resilient spring and provides easier riding qualities to the truck frame than can be obtained if the swing bolster is supported by a resilient arrangement which carries the normal balanced vertical load and also provides a resilient restraint against tilting of the truck.

In order to provide for transverse tilting and shocks with resilient restraint against excessive transverse tilting of the truck, I provide a restraining interconnected link mechanism extending between the sides of the truck frame and arranged to equalize the load on both sides of the truck. The interconnected link mechanism includes two complementary sections provided with transversely extending equalizer links 92 and 93 pivotally secured intermediate the ends thereof by pivot pins 94 to downwardly extending brackets 95 formed on the under side of the swing bolster 81. The brackets 95 on each side of the link mechanism are secured together at the lower ends thereof by a tie bar 96 bolted thereto by bolts 97. The inner ends of the equalizer links 92 and 93 are pivotally and slidably connected together by a lost-motion connection including a socket 98 formed on the end of the link 92 and circular segments 99 rotatably mounted therein. The segment 99 is provided with a rectangular central opening 100 formed therein, and the inner end 101 of the equalizer link 93 is formed in a rectangular shape and slidably engages the opening 100 between the circular segments 99, and thereby provides a pivotal and slidable lost-motion connection between the inner ends of the links 92 and 93. The outer ends of the links 92 and 93 are pivotally secured by pivot pins 102 to the lower ends of upwardly extending links including socket links 103, which are threadedly secured to bolts 104. The bolts 104 and socket links 103 extend through openings formed in the lower ends 105 of casings 106 secured to ears 107 which are pivotally supported by pivot pins 108 on brackets 109 rigidly secured to the side frames 76 of the truck frame. The lower ends 105 of the casings 106 and tapered sides 110 at the upper ends of the casings 106 provide stops for oppositely disposed axially movable spring seats 111 and 112 arranged adjacent the upper and lower ends of the casings 106 and biased apart by coil springs 113 arranged within the casings 106 and about the shank of the bolt 104. In this manner, the coil springs 113 are retained under compression between the spring seats 111 and 112 and bias the upper spring seat 111 against the under side of the head of the bolt 104 of the lower spring seat 112 against the lower end 105 of the casing 106.

If the loading on the two sides of the truck is not equal, the unbalanced vertical force acting on the truck frame will tend to produce a transverse tilting of the frame. Such tilting of the frame causes the casing 106 on the side of the frame which is tilted downwardly to move in a downward direction with the result that a downward force is transmitted to the pivot pin 102 which tends to pivot the equalizer link on this side of the truck and causes the inner end of this equalizer link to move in an upward direction. This upward movement of the inner end of the equalizer link on the lower side of the truck tends to move the inner end of the equalizer link on the other side of the truck in an upward direction which tends to pivot this other equalizer link about its pivot pin 94 and tends to lower the pivot pin on the outer end of this other link, and thereby moves the bolt 104 and the spring seat 111 on this other side of the truck frame in a downward direction. This tends to compress the spring 113 between the spring seats 111 and 112 respectively and transmits a downward force through the spring seat 112 to the lower end 105 of the casing 106 and through the pivot pin 108 and the bracket 109 to the side frame 76 on the other side of the truck, and thereby tends to lower this other side of the truck, thereby restraining the transverse tilting of the truck by transmitting part of the unbalanced vertical force transversely of the truck so as to equalize the loading on the two sides of the truck.

Any balanced vertical loads on the truck are not transmitted through this interconnected link mechanism, as the casings on both sides of the truck tend to move in the same direction and the equalizer links on each side of the truck tend to pivot in the same direction, and thereby do not transmit any forces between the two sections of the link mechanism on the two sides of the truck.

Furthermore, if unbalanced vertical forces are transmitted to the swing bolster 81 through one of the side bearings 83, or in any other manner, the side of the swing bolster which tends to move in a downward direction due to such unbalanced vertical force causes the pivot pin 94 intermediate the ends of the equalizer link on that side of the truck to move in a downward direction, thereby moving the pivot pin 102 at the outer end of the link in a downward direction and transmitting part of this unbalanced force through the head of the bolt 104, to the spring seat 111, to the coil spring 113, thereby compressing this spring and transmitting the force through the spring seat 112 to the casing 106 and to the side frame 76 on the side of the truck adjacent the side bearing 83 to which the unbalanced vertical force was applied. This downward movement of the pivot pin 94 on this side of the swing bolster also tends to move in a downward direction the inner end of the equalizer link on this side of the truck, and this tends to move in a downward direction the inner end of the equalizer link on the other side of the truck and causes this equalizer link to pivot about its pivot pin 94. This tendency of this equalizer link to pivot about its pivot pin 94 causes the pivot pin 102 at the outer end of this equalizer link to move in an upward direction, so as to move upwardly the lower spring seat 112 and compress the spring 113 on this side of the truck between the spring seat 112 and spring seat 111, as the spring seat 111 is prevented from moving upwardly by engagement with the tapered portions 110 of the casing 106 and engagement with the lower edge of the ears 107. Thus, the part of the unbalanced force which is transmitted to the coil spring 113 on this other side of the truck is resisted by the relatively stationary pivot pin 108 which pivotally secures the casing 106 to the bracket 109 and the side frame 76 on this other side of the truck, and an opposite reaction force is transmitted from this pivot pin 108 on this other side of the truck through the compression spring 113, to the lower spring seat 112, to the shoulder on the socket 103 at the lower end of the bolt 104, to the pivot pin 102 on the outer end of the equalizer link on this other side of the truck, and this reaction force resists upward movement of this outer end of the equalizer link.

In this manner, the reaction force on this other side of the truck tends to prevent upward movement of the outer end of the equalizer link and the unbalanced force acting on the inner end of this equalizer link through the downward movement of the inner end of the equalizer link on the side of the truck to which the unbalanced force is applied both tend to produce a downward movement of the equalizer link on this other side of the truck. This results in a downward force upon the pivot pin 94 intermediate the ends of this equalizer link on the other side of the truck, and tends to produce a downward movement thereof, thereby transmitting a downward force to this other side of the swing bolster and equalizing the unbalanced force on the two sides of the swing bolster, which tends to restrain tilting of the equalizer bolster relative to the truck frame and equalizes the load on the two sides of the truck.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A truck having wheels and axles, equalizers extending between and supported by adjacent axles, a truck frame, means for resiliently supporting said truck frame at each side on said equalizers, a swing bolster supported on said truck frame, means including an interconnected link mechanism including a pair of links pivotally secured at the outer ends thereof for resilient relative vertical movement to said truck frame and extending between the sides of said truck frame, the inner ends of said pivoted links being pivotally secured together by a lost-motion connection, and means for pivotally securing said links intermediate the ends thereof to said swing bolster.

2. A truck having a frame and including an element extending transversely between the sides of said frame, means for supporting said transversely extending element on said truck frame, means including a link mechanism including a plurality of sections extending between each side of said frame for equalizing vertical forces on both sides of said truck transversely between said transversely extending element and said truck frame, each of said sections comprising a pair of oppositely disposed axially movable spring seats, a spring arranged to bias apart said pair of spring seats, stops pivotally secured to said frame and arranged to limit the outward movement of said spring seats, means extending between said spring seats engaging the outer side of said spring seats for transmitting forces through said spring seats to compress said spring, a link pivotally connected intermediate the ends thereof to said transversely extending element, means pivotally connecting the outer end of said link to said force transmitting means, and means including a lost-motion connection for pivotally securing together the inner ends of said links of each of said sections.

3. A truck having a frame including a pair of spaced apart transoms extending between the sides of said truck frame, a bolster arranged between said pair of transoms, means for resiliently supporting said bolster on said transoms, means including a link mechanism including two sections for equalizing vertical forces transversely between said bolster and said truck frame transversely of the two sides of said frame, each of said sections comprising a casing secured to said sides of said frame and a pair of axially movable spring seats arranged therein, a spring arranged to urge apart said pair of spring seats, means extending between and engaging said spring seats for transmitting forces through said spring seats to compress said spring, a link pivotally connected intermediate the ends thereof to said bolster, means pivotally connecting the outer end of said link to said force transmitting means, and means including a lost-motion connection for pivotally securing together the inner ends of said links of each of said sections.

4. A truck having wheels, axles supported by said wheels, equalizers extending between and supported by said axles, a truck frame having side frames, a pair of spaced apart transoms extending between and connecting said side frames, means for resiliently supporting said truck frame on said equalizers, a swing bolster arranged between said transoms, a plurality of swing links, each of said swing links being arranged adjacent a different end of a different one of said transoms and pivotally connected thereto, a pair of tie bars, one of said tie bars being pivotally supported on each side of said truck on swing links at adjacent ends of different transoms, means including a pair of transversely extending springs pivotally supported on said tie bars and arranged to support resiliently said bolster for transmitting vertical forces between said bolster and said transoms, and means including an interconnected link mechanism arranged intermediate said transverse springs and extending between said side frames for equalizing the vertical forces transmitted between said bolster and said truck frame to said resilient frame supporting means, said link mechanism including links pivotally connected to said truck side frames and to said bolster, and means for providing a lost motion pivotal connection between the inner ends of said links.

5. A truck provided with a truck frame having side frames, a swing bolster extending transversely of said truck frame, swing links pivotally supported on opposite sides of said truck frame, means including transversely extending springs pivotally supported upon said swing links for resiliently supporting said bolster and for transmitting vertical forces between said bolster and said truck frame, and means including an interconnected link mechanism arranged intermediate said transverse springs and extending between said side frames for equalizing the load on said side frames, said link mechanism including links pivotally connected to said truck side frames and to said bolster, and means for providing a lost motion pivotal connection between the inner ends of said links.

6. A truck having wheels, axles supported by said wheels, equalizers extending between and supported by said axles, a truck frame having side frames, a pair of longitudinally spaced apart transoms extending between and connecting said side frames, means for resiliently supporting said truck frame on said equalizers, a swing bolster arranged between said transoms, a plurality of swing links arranged adjacent the ends of said transoms and pivotally connected thereto, means for supporting said swing bolster on said swing links for transmitting vertical forces between said bolster and said transoms and providing for relative lateral movement therebetween, a plurality of vertically extending transverse bearings arranged adjacent the ends of said transoms on the inner vertically extending side thereof, means including complementary side bearings adjacent each end of said swing bolster arranged to engage said transverse bearings for transmitting longitudinal forces between said bolster and said transoms, means including a link mechanism having a pair of links pivotally connected together at the inner ends thereof and connected at each outer end thereof to the adjacent side frame of said truck and having resilient elements arranged to transmit resiliently vertical forces in both directions on said links with respect to said truck frame for restraining tilting of said truck frame and for equalizing the forces on each side of said truck, and means for pivotally connecting each of said links intermediate the ends thereof to said swing bolster.

ROBERT G. ANDERSON.